(12) United States Patent
Meddah

(10) Patent No.: US 11,889,937 B2
(45) Date of Patent: Feb. 6, 2024

(54) APPARATUS AND METHOD FOR SECURING DELIVERED PACKAGES

(71) Applicant: Ismail Meddah, Villefranche (FR)

(72) Inventor: Ismail Meddah, Villefranche (FR)

( * ) Notice: Subject to any disclaimer, the term of this patent is extended or adjusted under 35 U.S.C. 154(b) by 394 days.

(21) Appl. No.: 17/348,112

(22) Filed: Jun. 15, 2021

(65) Prior Publication Data
US 2022/0395124 A1    Dec. 15, 2022

(51) Int. Cl.
| A47G 29/14 | (2006.01) |
| A47G 29/18 | (2006.01) |
| G08B 3/10 | (2006.01) |
| B64F 1/32 | (2006.01) |
| A47G 29/30 | (2006.01) |

(52) U.S. Cl.
CPC .......... *A47G 29/141* (2013.01); *A47G 29/18* (2013.01); *A47G 29/30* (2013.01); *B64F 1/32* (2013.01); *G08B 3/1016* (2013.01); *A47G 2029/145* (2013.01)

(58) Field of Classification Search
CPC ...... A47G 29/141; A47G 29/18; A47G 29/30; A47G 29/20; A47G 2029/144; A47G 2029/145; A47G 29/24; B64F 1/32; B64C 39/024; B64D 1/02; B64U 2101/64; G08B 3/1016; G08B 3/10; G08B 13/1463
USPC .......................................................... 232/19
See application file for complete search history.

(56) References Cited

U.S. PATENT DOCUMENTS

| 6,426,699 | B1 * | 7/2002 | Porter ................... A47F 10/00 340/568.1 |
| 10,026,054 | B1 * | 7/2018 | Staton ................... B64C 39/024 |
| 10,076,204 | B1 * | 9/2018 | Sadeghi ............... A47G 29/141 |
| 10,093,454 | B1 * | 10/2018 | Kalyan .................. A47G 29/12 |
| 10,321,780 | B1 * | 6/2019 | James ................... A47G 29/141 |
| 10,786,104 | B1 * | 9/2020 | Pappas .................. A47L 23/266 |
| 10,869,570 | B2 * | 12/2020 | Dunkelberger ........ A44B 19/30 |
| 10,993,567 | B1 * | 5/2021 | Cabral-McKeand ....................... A47G 29/20 |
| 11,185,181 | B2 * | 11/2021 | Khatchikian ........ A47G 29/141 |
| 11,197,567 | B2 * | 12/2021 | Lemieux .............. A47G 29/141 |
| 11,406,212 | B2 * | 8/2022 | Odeh .................... A47G 29/141 |
| 11,412,876 | B1 * | 8/2022 | Kadlub .................. A47G 29/20 |
| 2016/0051073 | A1 * | 2/2016 | Heinz ................... A47G 29/20 232/39 |
| 2017/0106979 | A1 * | 4/2017 | Seger ....................... B64F 1/00 |
| 2018/0162612 | A1 * | 6/2018 | Bojic ................. B65D 33/2516 |
| 2018/0202199 | A1 * | 7/2018 | Critz .................... E05B 73/0005 |
| 2019/0104876 | A1 * | 4/2019 | Loures .................... E05B 73/00 |

(Continued)

*Primary Examiner* — William L Miller
(74) *Attorney, Agent, or Firm* — Mohr Intellectual Property Law Solutions, PC

(57) ABSTRACT

A system and method for securing delivered packages is provided. One embodiment employs a j-shaped or u-shaped support member secured to a fixed location structure; a basket configured to receive a delivered package; an articulated frame that opens to receive the delivered package into the basket; and that closes to secure the delivered package within the basket; a latch; and a controller system controllably coupled to the latch, wherein the controller system releases the latch in response to an arrival of a package so that the articulated frame is opened to receive the delivered package into the basket, and wherein after the articulated frame is closed with the delivered package residing in the basket, the latch is engaged to lock the closed articulated frame.

20 Claims, 6 Drawing Sheets

(56) References Cited

U.S. PATENT DOCUMENTS

| | | | |
|---|---|---|---|
| 2019/0133362 A1* | 5/2019 | Gilligan | A47G 29/20 |
| 2019/0233111 A1* | 8/2019 | High | B64D 1/12 |
| 2019/0246828 A1* | 8/2019 | Miller | A47G 29/124 |
| 2019/0269268 A1* | 9/2019 | Blubaugh | G08B 13/126 |
| 2020/0013008 A1* | 1/2020 | Newcomb | G05D 1/102 |
| 2020/0015617 A1* | 1/2020 | Izquierdo Gonzalez | E05B 67/22 |
| 2020/0060460 A1* | 2/2020 | Farrar | A47G 29/141 |
| 2020/0093310 A1* | 3/2020 | Hauck | A47G 29/20 |
| 2020/0180880 A1* | 6/2020 | Gil | B64C 39/024 |
| 2020/0288895 A1* | 9/2020 | Bennet | H04W 12/08 |
| 2021/0045563 A1* | 2/2021 | Bartley-Clark | A47G 29/141 |
| 2021/0267401 A1* | 9/2021 | Benevento | E05B 65/52 |
| 2021/0282581 A1* | 9/2021 | Odeh | A47G 29/20 |
| 2022/0007871 A1* | 1/2022 | Schwarz | A47G 29/30 |
| 2022/0151420 A1* | 5/2022 | Pappas | B60W 60/001 |
| 2022/0192406 A1* | 6/2022 | Haley | A47G 29/20 |

* cited by examiner

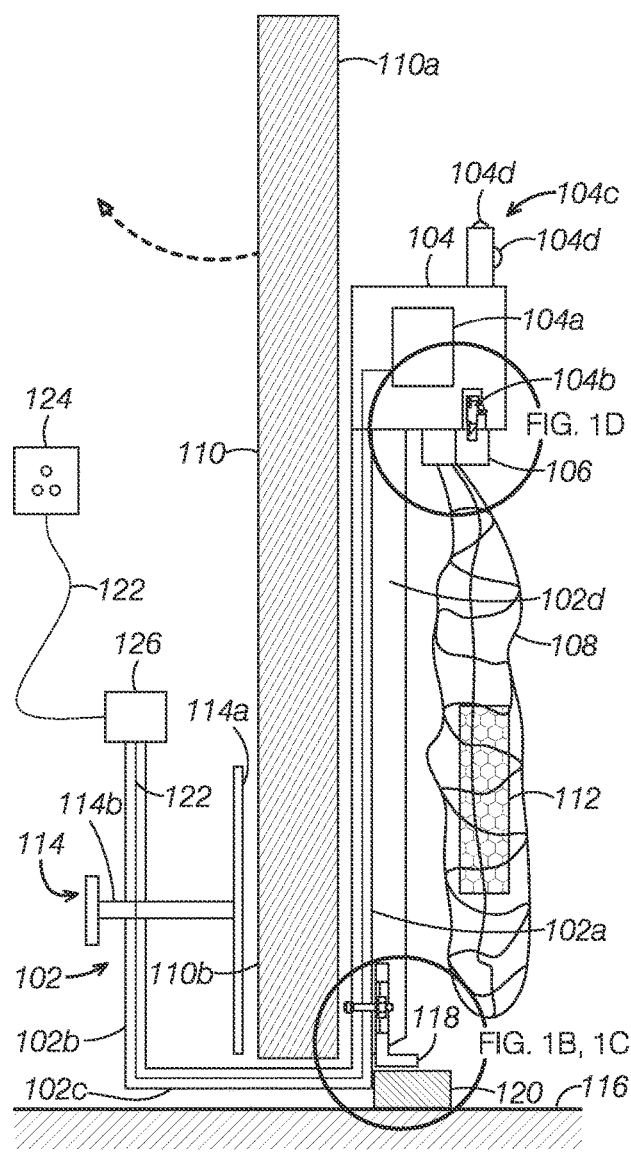
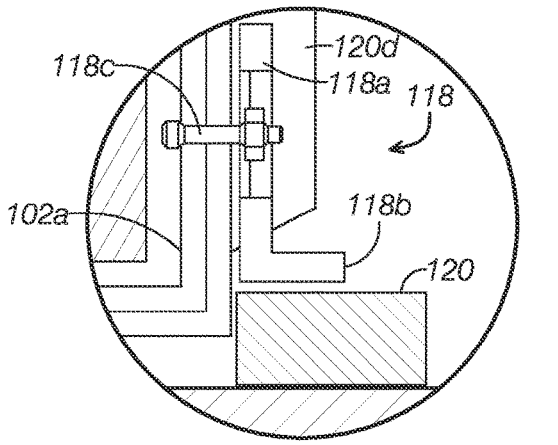
FIG. 1B
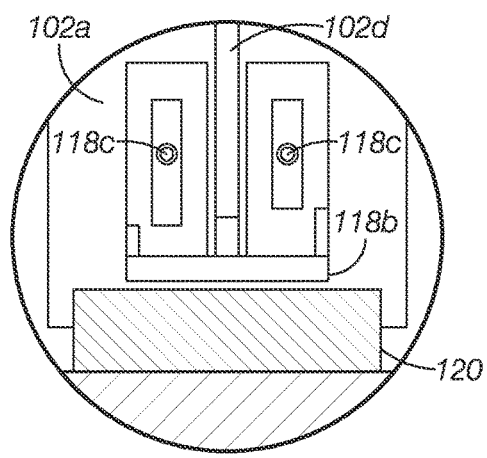
FIG. 1C
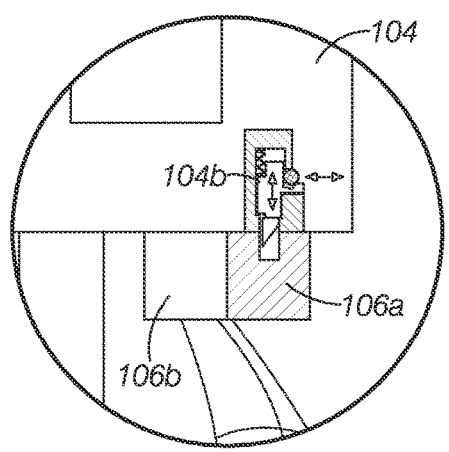
FIG. 1D
FIG. 1A

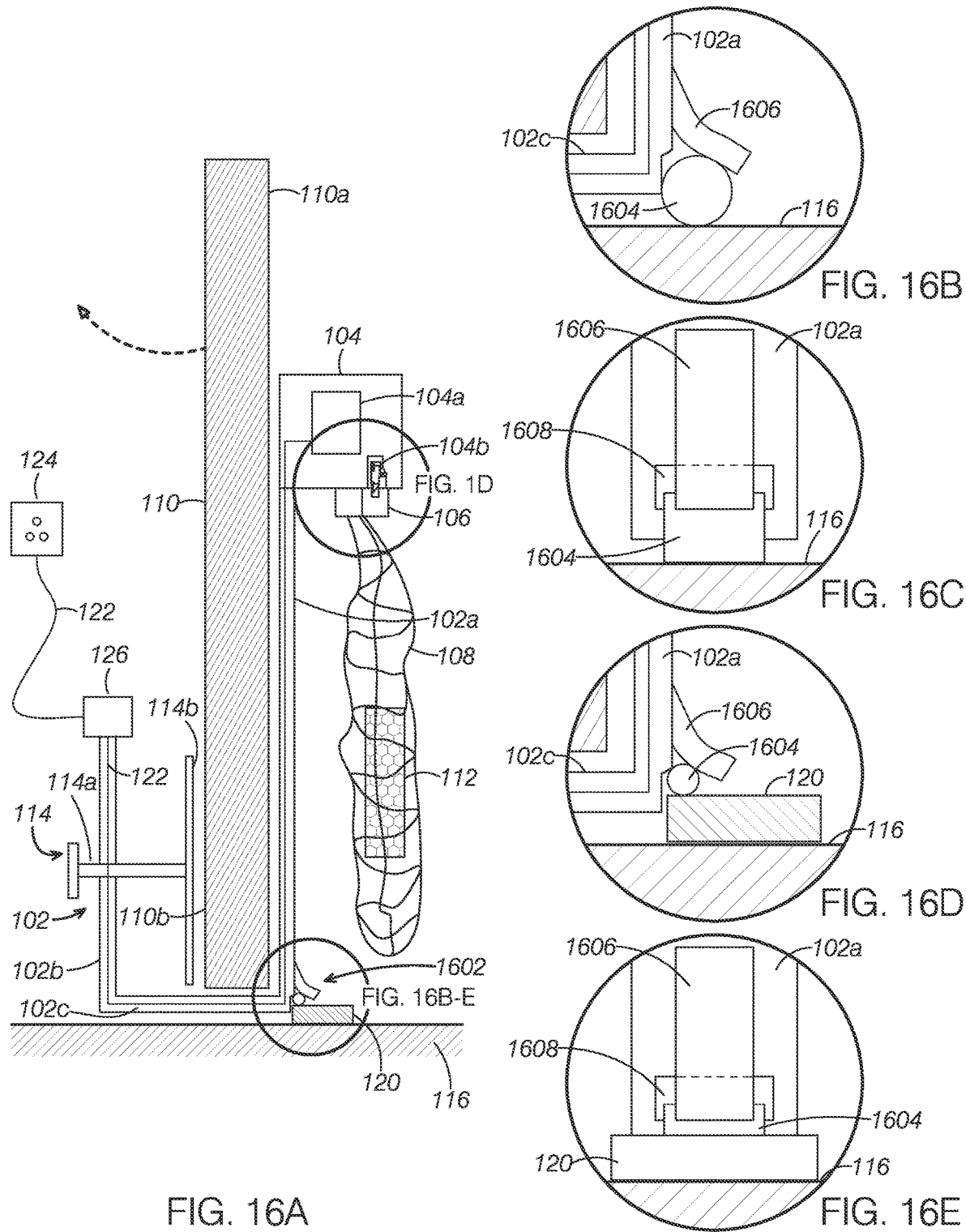

APPARATUS AND METHOD FOR SECURING DELIVERED PACKAGES

BACKGROUND OF THE INVENTION

Home delivery of packages is becoming increasingly common. For example, consumers are able to make online purchases of a product via the Internet. Such packages, when delivered, are often left outside of a home or building where the package is delivered to. Here, it is assumed that a person inside the home or building will come to the door and take the delivered package inside so that the package is secure.

Unfortunately, theft of such delivered packages is also becoming increasingly common. Even if the delivered package is somewhat hidden, such as behind a plant or fence, the delivered package is still subject to theft (until the person inside the home or building comes outside to secure the delivered package).

Further, airborne package deliveries by drones or other aircraft is becoming common. Drone delivered packages cannot be hidden from easy view since the drone must keep some minimum distance away from structures and other physical objects. Such drone-delivered packages are readily visible to thieves.

Accordingly, in the arts of package delivery to a home or building, there is a need in the arts for improved methods, apparatus, and systems for securing such delivered packages from theft.

SUMMARY OF THE INVENTION

Embodiments of the delivered package security system provide a system and method for receiving a delivered package, and then securing the delivered package from theft. One example embodiment employs a j-shaped or u-shaped support member secured to a fixed location structure; a basket configured to receive a delivered package; an articulated frame that opens to receive the delivered package into the basket; and that closes to secure the delivered package within the basket; a latch; and a controller system controllably coupled to the latch, wherein the controller system releases the latch in response to an arrival of a package so that the articulated frame is opened to receive the delivered package into the basket, and wherein after the articulated frame is closed with the delivered package residing in the basket, the latch is engaged to lock the closed articulated frame.

BRIEF DESCRIPTION OF THE DRAWINGS

The components in the drawings are not necessarily to scale relative to each other. Like reference numerals designate corresponding parts throughout the several views.

FIGS. 1A-1D are side view of an example embodiment of a delivered package security system.

FIGS. 16A-16E are drawings of an example embodiment of a delivered package security system.

DETAILED DESCRIPTION

Figure 2:
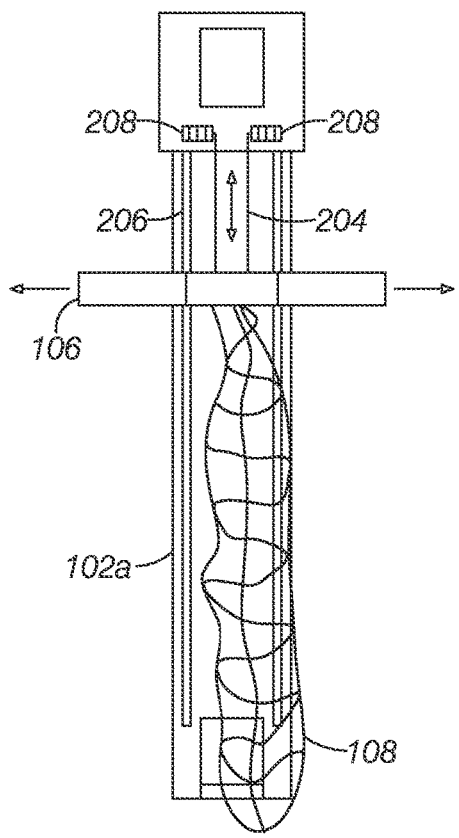
FIG. 2 is a front view of an embodiment of the delivered package security system.

FIGS. 1A-1D are side views of an example embodiment of a delivered package security system 100. Embodiments of the delivered package security system 100 comprise a support member 102, a controller system 104, an articulated frame 106, and a basket 108.

In practice, the rigid support member 102 is secured (affixed) to a fixed structure. Here, a fixed location structure or object is defined as a physical object or structure that cannot be removed or relocated without destruction of the fixed location structure or object, and/or the structure or object that the fixed location structure is secured to. (As disclosed herein, the terms "structure" and "object" are equivalent and interchangeable with each other.) Non-limiting examples of a fixed location structure or object include, but are not limited to, a door, a window, a gate, a balcony, a fence, a post, a vehicle, a tree, a rock, or some other fixed location structure or object that is not removeable. The rigid support member 102 is preferably secured without altering the fixed location object or structure. Preferably, the support member 102 is removably secured to the fixed location object or structure, and cannot be removed from the fixed location object or structure by a thief or an unauthorized person. The non-limiting exemplary fixed structure or object illustrated in FIGS. 1A-1D is a door 110.

In the various embodiments, the articulated framework 106 is fixed to the J-shaped outside support member 102a or to the reinforced housing of the controller system 104. The interior of the reinforced housing of the controller system 104 is accessible only when the rigid support member 102 is not secured to a fixed structure. The articulated frame 106 supports a basket 108. The basket 108 can be made of reinforced metal chains or reinforced ropes having small enough mesh openings to securely store a delivered package 112 (thereby preventing theft of the delivered package 112 from the basket 108). In an example embodiment, the opening of the basket 108 is secured to the underside of the articulated frame 106. In other embodiments, opening of the basket 108 may be secured to other structure so that when the articulated frame 106 is opened, access to the basket 108 is provided.

When a package 112 is being delivered, the articulated frame 106 is released and opened. The delivery person places the delivered package 112 into the basket 108 vi the opened articulated frame 106. The articulated frame 106 is then closed and secured. Preferably, the controller system 104 opens the articulated frame for package delivery, and then closes and secures the articulated frame 106 so that the delivered package 112 is secured within the basket 108. Alternatively, or additionally, a courier who delivered the package 112 may close and/or secure the articulated frame.

When the owner (interchangeably referred to herein as a customer or an authorized person) returns or wishes to access the delivered package 112 that has been secured within the basket 108, the owner causes the delivered package security system 100 to release and open the articulated frame 106. Then, the owner may retrieve the delivered package 112 from the basket 108.

The disclosed systems and methods for a delivered package security system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for a delivered package security system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device exchanges information with another electronic device, either wirelessly or with a wire based connector, whether directly or indirectly through a communication network 108. "Controllably coupled" means that an electronic device controls operation of another electronic device.

Returning to FIG. 1, the non-limiting example embodiment employs a support member 102 that is generally formed in a j-shape or u-shape. In the illustrated example embodiment, an outside support member 102a extends upwardly along an outside surface 110a of the door 110. The distal end of the outside support member 102a supports the controller system 104, the articulated frame 106, and the basket 108. An inside support member 102b extends upwardly along, and in proximity to, the interior side 110b of the door 110.

A joining support member 102c connects the proximal ends of the outside support member 102a and the inside support member 102b. In the various embodiments, the thickness of the joining support member 102c is less that the clearance space between the floor 116 and the bottom of the door 110. Accordingly, the door 110 can be freely opened and closed without interference between the floor 116 and the joining support member 102c.

In some embodiments, the support member 102 may be formed of a unibody piece of metal that is bent, molded, and/or extruded. Alternatively, the support member 102 may be formed of different pieces of metal or another rigid material that are secured together, such as, but not limited to, using welds, screws, bolts, adhesive or the like.

In some embodiments, an optional reinforcing member 102d may be added to reinforce the strength of the outside support member 102a. (In cross section, the outside support member 102a and the optional reinforcing member 102d would be T-shaped.) Here, the optional reinforcing member 102d would resist an outward bending motion or force applied to the outside support member 102a that might occur during a theft attempt. Any suitable length of material may be used for the reinforcing member 102d. Preferably, the reinforcing member 102d extends downward proximate to the lower end of the outside support member 102a. A similar reinforcing member (not shown) may be optionally used to reinforce the strength of the inside support member 102b.

In this non limiting example embodiment, the door 110 swings inward to open. When the door 110 is opened, the support member 102 is installed by sliding the joining support member 102c underneath the bottom of the door 110 to a desired location. An attachment means 114 is used to releasably secure the support member 102. Here, a locking plate 114a is urged onto the inside surface 110b of the door 110 such that the locking plate 114a of the attachment means 114 and an inside surface of the outside support member 102a frictionally secure the support member 102 to the door 110. In an example embodiment, a proximal end of a tightening bolt 114b threaded through a threaded aperture disposed near the top of the inside support member 102b is used to urge and tighten a locking plate 114a (secured to the distal end of the tightening bolt) to the inside surface of the door 110 to rigidly and releasably secure the delivered package security system 100 to the door 110. Other attachment means 114 may be used, such as screws, bolts, adhesives, rackets, or the like to secure the delivered package security system 100 to the door. In some embodiments, the locking plate 114a may be affixed to the inside surface 110b of the door 110.

When the door 110 is closed, the delivered package security system 100 cannot be released from the outside of the door 110 (particularly if the door is locked and secured). With the various embodiments, it is impossible, or at least is exceedingly difficult, to open the articulated frame 106 and/or remove the secured delivered package security system 100 from the door 110. Accordingly, the delivered package 112 secured within the basket 108 and cannot be removed or opened.

In a preferred embodiment, the attachment means 114 is releasable so that the delivered package security system 100 can be conveniently removed and re-installed by the owner. For example, if the owner is expecting a package to be delivered, the owner may install the delivered package security system 100 in anticipation of the package delivery.

After the owner has removed the delivered package 112 from the basket 108, the owner may release the delivered package security system 100 from the door 110 and stow the delivered package security system 100 in a convenient location.

In some embodiments, an optional reinforcement plate 118 may be secured to the proximal lower end of the outside support member 102a. Often, a door jamb 120 or other door threshold member may be secured to the floor 116 as part of the door frame (not shown). A portion of the reinforcement plate 118 extends outwardly from the outer surface of the outside support member 102a. Preferably, the reinforcement plate 118 is a rigid L-shaped member made of metal, plastic, wood or the like. FIG. 1B illustrates a magnified side view of the reinforcement plate 118. FIG. 1C illustrates a magnified front view of the reinforcement plate 118. In some embodiments, the reinforcement plate 118 and the reinforcing member 102d may be formed as a single unibody piece. Any suitable securing means may be used to secure the reinforcement plate 118 to the outside surface near the proximal end of the outside support member 102a, such as screws, adhesive, welding, extruding, molding, or the like.

In the non-limiting example, the reinforcement plate 118 is defined by an upper member 118a and a lower member 118b. The upper member 118a of the reinforcement plate 118 is secured to the outside surface of the outside support member 102a using a bolt 118c that can only be released when the delivered package security system 100 has been removed from the door 110. Further, the upper member 118a can have its position slidably adjusted upward or downward so that the lower member 118b is positioned so as to provide a minimal clearance with the door jamb 120 to permit the door 110 to be freely opened and closed without interference from the lower member 118b of the reinforcement plate 118.

In the event of a theft attempt, the thief may try to bend the outside support member 102a of the delivered package security system 100 by applying a force that is outward and away from the door 110. The lower member 118b would then be urged against the upper surface of the door jamb 120, thereby resisting the thief's effort to bend the outside support member 102a of the delivered package security system 100 outward and away from the door 110.

In the various embodiments, the controller system 104 includes various electrical components that operate and control the delivered package security system 100. A processing system 104a comprising a central processing unit (CPU), a memory, one or more controllers, one or more input/output (I/O) interfaces, power connections, an optional transceiver, an optional barcode reader, an optional finger print scanner, another optional biometric identification device, a camera, a motion detector, an alarm, a thermometer, a weight sensor, a sound sensor, a keyed lock, etc., may reside in the controller system 104.

Embodiments offer a seamless delivery from the customer's point of view. Once the customer makes a remote purchase from a retailer, for example, the package barcode may be linked to the customer's account to initiate the delivery process. The delivered package security system 100 may be communicatively coupled to the customer's retail account and has access to the barcode information. Once the courier arrives at the customer's door, the barcode reader is activated through its integrated motion detector and the courier scans the package barcode. After identification, the barcode reader allows the release of the bag framework's latch 104b. FIG. 1D is a closeup diagram of the latch 104b. The courier can then manually open the articulated frame members 106 to create an opening corresponding to the dimensions of the package 112, drops the package 112 into the basket 108, and then closes and secures the articulated frame members 106 by re-engaging the latch 104b. The package 112 is then "enveloped" in a reinforced chained bag 108, which cannot be opened by a thief. One skilled in the arts appreciates that the customer's involvement is in no way needed in this delivery process while at home or away. The customer can then release the latch 104b to open the articulated frame 106 to access the interior of the bag 108. In an example embodiment, the owner may scan their fingerprint on a dedicated biometric scanner, which then causes the processing system 104a to release the latch 104b. Note also that a thermal insulated bag or material can be placed inside the chained bag 108 to store cooled fresh groceries.

In another embodiment, a smart door bell system 104c with a camera 104d may be used to release the latch 104b. Here, the vendor's courier would push a smart doorbell button 104d of the smart door bell system 104c, or otherwise actuate the smart door bell system 104c upon detecting the presence of the courier, and get into camera contact with the customer's electronic device, such as their smartphone, personal computer, laptop, or the like. In some embodiments, presence of the courier may be determined from image data acquired by the camera 104d. In some embodiments, the camera 104d is, and/or includes, a motion detector that detects the presence of the courier (or even a thief). In response to identifying the courier and/or the package, the owner or authorized person may communicate a release signal to the controller system 104 that releases the latch 104b.

In an example embodiment, the smart door bell system 104c may be an integrated component of the delivered package security system 100. For example, a smart door bell system 104c may be secured to the outside support member 102a and/or the controller system 104. Alternatively, the smart doorbell may be an integrated component of the controller system 104. Some embodiments may be adapted to integrate with a legacy smart door bell system.

In an example embodiment, the customer can remotely send a Wi-Fi based release signal generated from their smartphone to release the latch 104b and allow the courier to open the articulated frame members 106 and drop the package into the bag 108. The courier may then close the articulated frame members 106, and then secure the articulated frame members 106 using the latch 104b. In other embodiments, the controller system 104 may automatically close the articulated frame members 106, and then secure the articulated frame members 106 using the latch 104b.

In some embodiments, a reinforced locker (not shown) can also be placed in the apparatus' reinforced housing. The locker can be accessed only after authorization by the customer. The reinforced locker opening can be allowed through another Wi-Fi release signal from the customer's smartphone. The reinforced locker can store the house door key for big item deliveries requiring the door opening by the courier (e.g. refrigerator, washing machine, etc.).

The processing system 104a, in response to a particular release command, causes the latch 104b to release the articulated frame 106. For example, one of the articulated frame members 106a may be configured to receive and lock with the latch 104b. When a lock command is received by the processing system 104a, the latch 104b is actuated so as to lock to the articulated frame member 106a. When locked, the articulated frame member 106a is locked and secured such that the articulated frame 106 cannot be opened to add or remove a package 112. When a release command is received, the processing system 104a causes the latch 104b to release from the articulated frame member 106a. When the articulated frame member 106a releases from the latch 104b, the articulated frame 106 may be opened so that a package 112 may be added into the basket 108 and/or may be removed from the basket 108. In some embodiments, the basket 108 may be sufficiently large so as to receive and retain multiple packages 112.

Lock and release commands may be generated in a variety of manners depending upon the particular embodiment. For example, a release command can be initiated by a delivery person by entering an alphanumeric pass code via an I/O device that is controllably coupled to and/or that is integrated into the controller system 104. An identification code, such as a barcode, a QR code, or the like located on the delivered package 112 or another object (such as the courier's ID) may be scanned by a scanner (such as the camera 104d, a smart door bell camera, or other suitable image capture device) that is controllably coupled to and/or that is integrated into the controller system 104. In another embodiment, the courier and/or customer may be identified in an image captured by a camera that is controllably coupled to and/or that is integrated into the controller system 104, wherein the courier and/or the owner may be identified using a facial recognition algorithm. A secure wireless message initiated from a smart phone or the like may be received by a transceiver that is controllably coupled to and/or that is integrated into the controller system 104. Alternatively, or additionally, the secure message may be received from a computer, via a wire based connector or via a wireless signal. Alternatively, or additionally, the owner's thumb print or other body part may be scanned by a scanning device that is controllably coupled to and/or that is integrated into the controller system 104. Alternatively, or additionally, an audible command may be detected by a microphone that is controllably coupled to and/or that is integrated into the controller system 104, wherein the spoken words of the courier and/or the owner may be recognized using voice recognition. In some embodiments, a camera may capture an image of the delivery person that is communicated to the owner, who may then elect to remotely release the latch 104b to open the articulated frame 106. Any suitable input may be used to initiate a release command by the delivery person and the owner. Other parties, such as a thief or unauthorized person, are not able to initiate or generate a release command that releases the latch 104b.

A lock command may be initiated in a variety of manners. In some embodiments, after the articulated frame 106 has been opened and the delivered package 112 placed inside the basket, the delivery person may manually close the articulated frame 106 such that the articulated frame member 106a becomes locked with the latch 104b. A sensor of the processing system 104a may detect contact with the articulated frame 106 to lock the latch 104b. Alternatively, or additionally, the articulated frame 106 may automatically close and then become locked after some predefined duration and/or after sensing the weight of the delivered package 112 in the basket 108. In some embodiments, a camera (such as the camera 104d, a smart door bell camera, or other suitable image capture device) may capture an image of the delivery person and/or the delivered package 112 in the basket 108 that is communicated to the owner. The owner may then remotely issue the lock command to lock the latch 104b. Alternatively, or additionally, an audible command may be used to initiate the lock command. Alternatively, or additionally, the delivery person or owner may enter an alphanumeric pass code or the like via an I/O device that is controllably coupled to and/or that is integrated into the controller system 104.

When the delivered package security system 100 contains one more or more electronic devices, such electronic devices require a power source for operation. Power may be provided via a power cord 122 that is electrically coupled to a conventional power outlet 124. If direct current (DC) power is required, a transformer 126 may be used to convert alternative current (AC) power received from the outlet 124 into DC power. Some embodiments may include one or more batteries (not shown) as a power supply.

Some embodiments of the delivered package security system 100 may not require power. For example, an embodiment that uses a lock and key system may be used to manually permit the articulated frame 106 to be opened and/or closed by the delivery person and/or the owner in possession of a physical key.

FIG. 2 is a front view of an embodiment of the delivered package security system 100. In this example embodiment, the articulated frame 106 is released by the controller system 104, and travels downward some predefined distance for opening of the articulated frame 106. In the illustrated example embodiment, the articulated frame member 106a includes one or more pins 202 that are guided by tracks 204 in the outside support member 102a.

The controller system 104 may let out a flexible cable member 204, such as, but not limited to, a cable, a cord, a chain or the like, that is controllably released along a guide 206. The cable member 204 may be operated by a motor 208, pulley or the like to release the articulated frame member 106. After the delivered package 112 is placed into the basket 108 by the delivery person or is removed from the basket 108 by the owner, the controller system 104 retracts the attachment member(s) 206 to draw the articulated frame 106 upward into a closed and secure position. The pins 202 may be optionally secured by a latch 104b when the articulated frame 106 is retracted.

FIGS. 3-7 are top views of the articulated frame 106 that opens to receive various sized delivered packages 112. The framework construction of the articulated frame 106 allows for a variable opening size to cater to different geometries of a delivered package 112. Multiple delivered packages 112 may be secured by embodiments of the delivered package security system 100.

Figure 3:
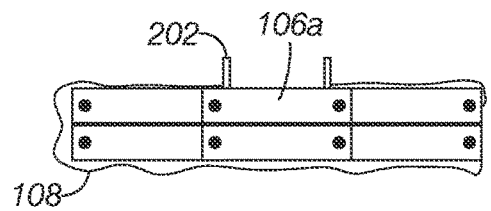
FIGS. 3-7 are top views of the articulated frame that opens to receive various sized delivered packages.
Figure 4:
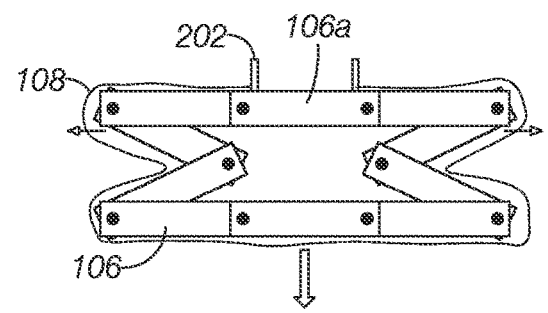
Figure 5:
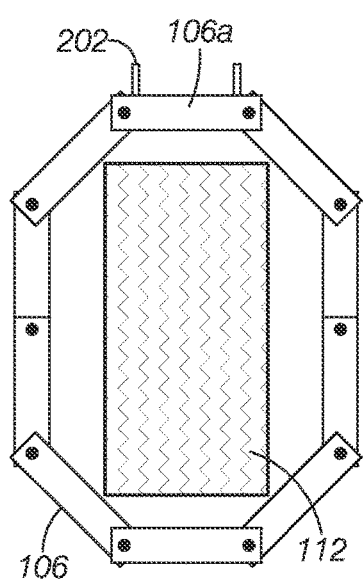
Figure 6:
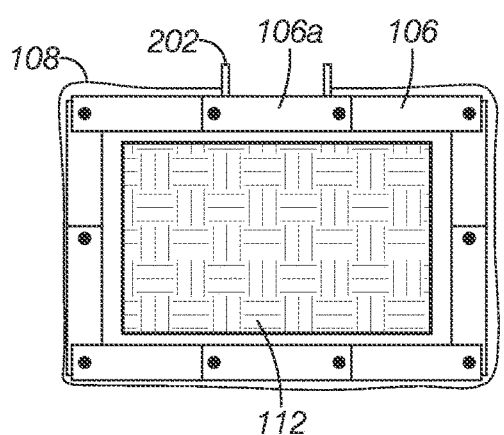
Figure 7:
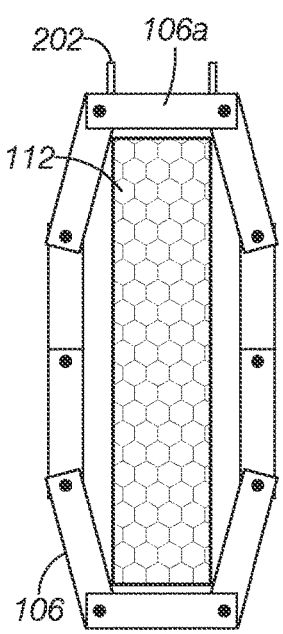

The illustrated example embodiment of the articulated frame 106 is constructed of a plurality of rigid segments that are pivotable secured at their ends to adjacent segments. When in a closed position, as illustrated in FIG. 3, the interior of the basket 108 cannot be accessed. As a side of the articulated frame 106 is initially moved outward, as illustrated in FIG. 4, the rigid segments pivot so as to enable the articulated frame 106 to open to receive and/or retrieve a package 112. FIGS. 5-7 illustrate that the segments of the articulated frame 106 can be arranged to receive different shaped packages 112.

An alternative embodiment may employ a closure cable as the articulated frame 106. In such embodiments, the cable may be released and pulled (or pushed) to an extended position to open the basket 108 to receive and/or retrieve a package 112. The closure cable may then be retracted to close the basket 108. Some embodiments may employ a spring to retract the closure cable. Preferably, the retracted closure cable is not accessible and is securely retained so as to prohibit an unauthorized person or thief from opening the basket 108. In some embodiments, the retracted closure cable resides within the interior of the enclosure of the controller system 104. For purposes of this disclosure, a closure cable is defined as an embodiment of an articulated frame 106.

Figure 8:
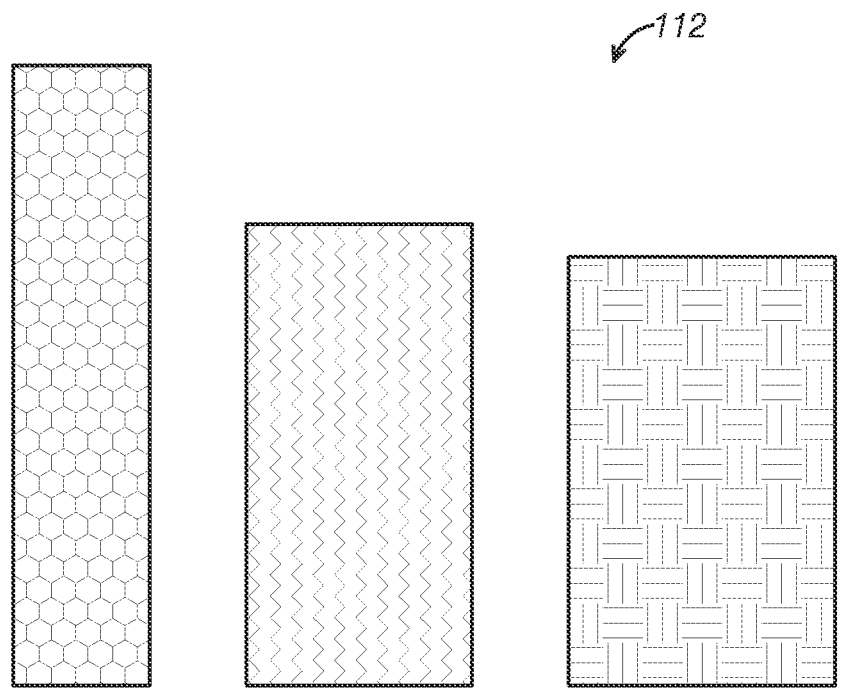
FIG. 8 is a side view diagram of various sizes of delivered packages that can be secured by the delivered package security system.

FIG. 8 is a side view diagram of various sized delivered packages 112 that can be secured by the delivered package security system 100. Different dimensions of the delivered package 112 can be accommodated in view of the multiple members that form the articulated frame 106. The plurality of member of the articulated frame 106 can be arranged as needed so that the delivered package security system 100 can receive and secure a variety of different shaped delivered packages 112.

Figure 9:
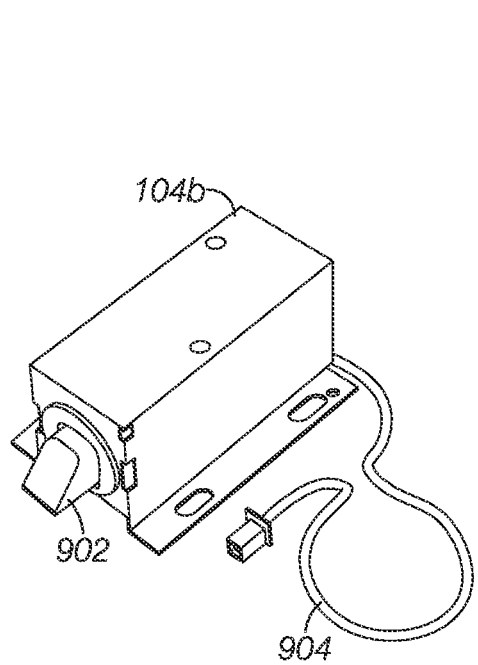
FIG. 9 is a perspective view of an electronically actuated latch.

FIG. 9 is a perspective view of an electronically actuated latch 104b. In the various embodiments, the latch 104b resides in or is controllably coupled to the controller system 104. The latch 104b is engaged so that a latch member 902 is extended into an aperture in the articulated frame 106 to lock the articulated frame 106. The latch member 902 is retracted to release the articulated frame 106.

A control connector 904 is communicatively coupled to the controller system 104. Accordingly, the processing system 104a may control operation of the latch 104b.

The latch 104b may be optionally spring loaded to retract or to extend the latch member 902. In some embodiments, the latch 104b is installed within the reinforced housing of the controller system 104 and cannot be accessed by a thief or other unauthorized person.

Other types of latches may be used in alternative embodiments. For example, but not limited to, am magnetic latch may be used to secure the articulated frame 106. When the articulated frame 106 is closed, the magnetic latch would be engaged (powered) to lock the articulated frame 106. When the articulated frame 106 is to be opened, the magnetic latch could be disengaged (unpowered) to release the articulated frame 106.

Some embodiments may employ other means to secure the articulated frame 106 in its closed position. For example, when the articulated frame 106 is a closure cable, rotatable cable rollers could be fixed and not be allowed to rotate, thereby securing the closure cable. In embodiments where the closure cable is wound onto a rotatable drum or the like, the rotatable drum could be fixed and not be allowed to rotate to secure the closure cable.

Figure 10:
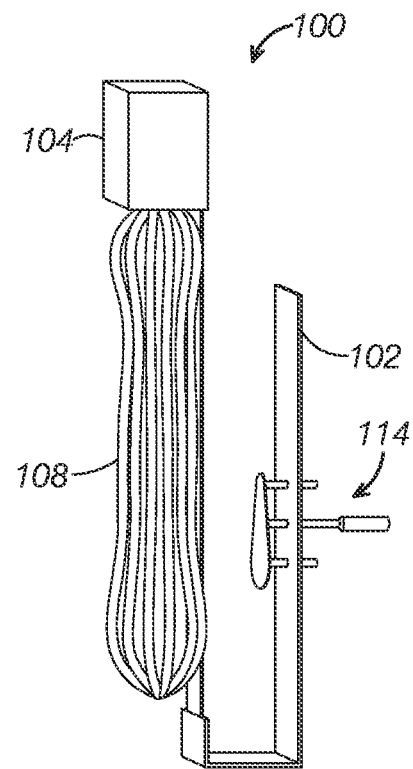
FIG. 10 is a perspective side view of a closed delivered package security system.
Figure 11:
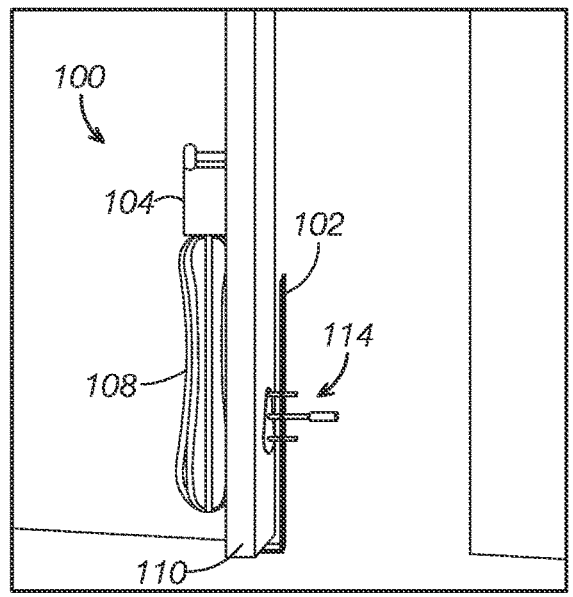
FIG. 11 is a perspective side view of a closed delivered package security system secured to a door.
Figure 12:
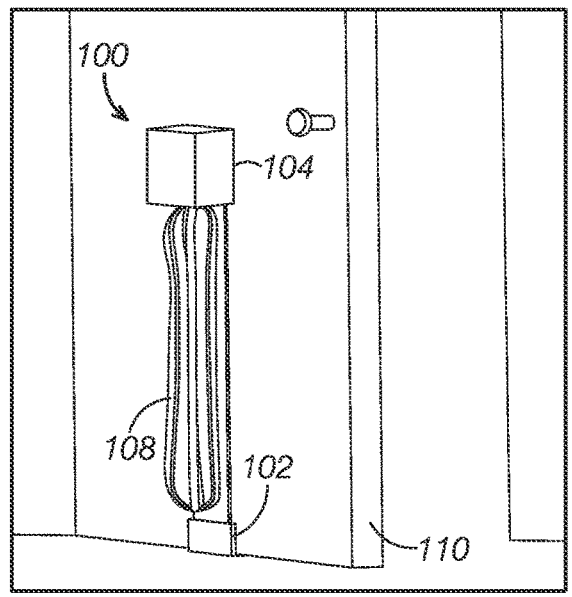
FIG. 12 is a perspective front view of a closed delivered package security system secured to a door.

FIG. 10 is a perspective side view of a closed delivered package security system 100. FIG. 11 is a perspective side view of a closed delivered package security system 100 secured to a door 110. FIG. 12 is a perspective front view of a closed delivered package security system 100 secured to a door 110. One skilled in the art appreciates that the example embodiment of the delivered package security system 100 can be readily secured to and removed from any door 110.

Figure 13:
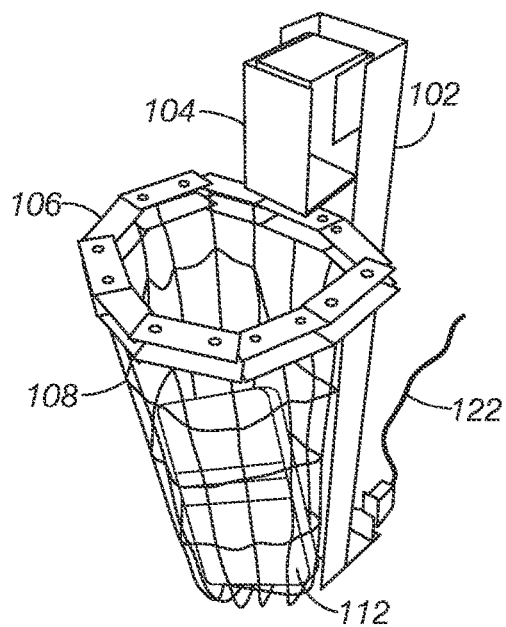
FIGS. 13-14 are perspective views of an embodiment of the delivered package security system secured to a door that is illustrated in a partially open position and a closed position.
Figure 14:
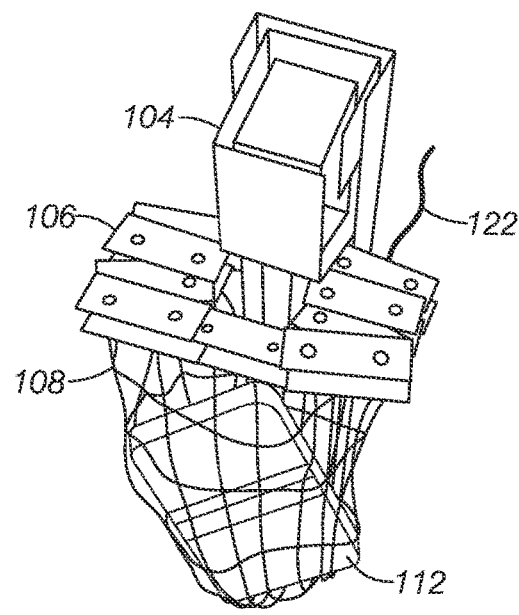

FIGS. 13-14 are perspective views of an embodiment of the delivered package security system 100 secured to a door 110 that is illustrated in a partially open position and a closed position. When open, a delivered package 112 is inserted into the basket 108. Then the articulated frame 106 is closed and locked to secure the delivered package 112 within the basket 108.

Figures 15A, 15B:
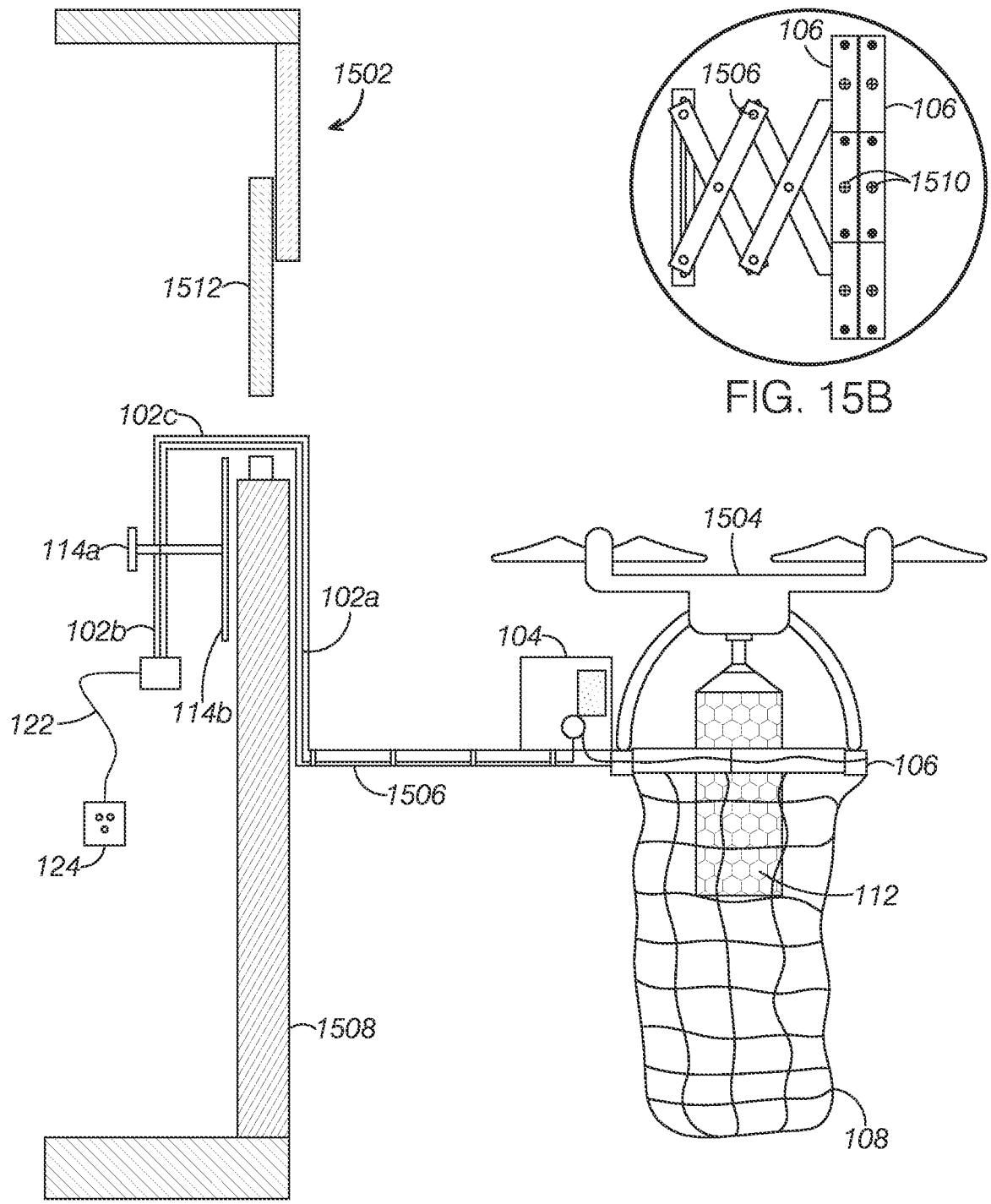
FIG. 15A is a side view of an embodiment of the delivered package security system secured to a window frame.
FIG. 15B is a close up top view of the partially extended arm and a closed articulated frame.

FIG. 15A is a side view of an embodiment of the delivered package security system 100 secured to a window frame 1502. FIG. 15B is a close up top view of the partially extended arm 1506 and a closed articulated frame 106. Elements previously illustrated and/or described herein may not be numbered and/or described further for brevity. The example delivered package security system 100 is configured to extend the articulated frame 106 and basket 108 outward to receive a delivered package 112 from a drone 1504. A counter weight may be used to balance the delivered package security system 100 on the window frame 2002

In this example embodiment, the controller system 104 receives a communication signal indicating a pending delivery from the approaching drone 2004. The signal may be communicated from the drone 2004 and/or from a remote device, such as a computer or the like.

The received signal may include various information of interest, including information identifying the drone 2004, identifying the carrier or delivery company, identifying the delivered package 112, etc. This information may be optionally communicated to the owner.

In response to receiving the signal, the controller system 104 operates to cause an extendable arm 1506 to extend the articulated frame 106 outward from the building 1508 by some predefined distance. Accordingly, a sufficient amount of clearance from the building 1508 and the drone 1504 landing on the top of the opened articulated frame 106 is provided. In some embodiment, physical guide means such as holes, slots, protruding tabs, a harness, or the like, located on or proximate to the surface of the articulated frame 106 may be used to guide and locate the drone 1504 into a precise location when the drone 1504 is landing on the top of the articulated frame 106. Alternatively, the drone 1504 may fly to and then hover in close proximity to the opened top of the articulated frame 106. The drone 1504 may then release the delivered package 112 which then falls through the opened articulated frame 106 and into the basket 108.

In a non-limiting example embodiment, the extendable arm 1506 may be spring loaded. A release latch may be actuated to release the spring from a tensioned state. The expanding spring extends the arm 1506. Alternatively, a motor could pull on a cable to extend the arm 2006 and concurrently tension a spring, wherein the spring would retract the arm 2006 after operation of the motor concludes. Optionally, a motor or the like may pull in a cable affixed to the distal end of the arm 2006 or to the articulated frame 106 to retract the arm 1506 after the package 112 has been delivered.

After the drone 1504 departs, the controller system 104 may then retract the extendable arm 1506 and close the articulated frame 106. Information corresponding to the completed delivery may be communicated to an electronic device of the owner, such as to their smart phone, personal computer, laptop, etc. The information may optionally be communicated to the operator of the drone 1504 to verify delivery. Embodiments provisioned with a camera may send an image of the delivered package 112 secured within the basket 108 to the owner's electronic device and/or the operator of the drone 1504. If the delivery of the package 112 is not successful, information pertaining to the failed delivery may be communicated to the owner and/or the operator of the drone 1504.

In some embodiments, the top surface of the articulated frame 106 may include an indicator 1510, such as, but not limited to markers, paint, colored tape, flashing lights, or other detectable indicators that the drone 1504 may use as a target to facilitate the landing onto the opened articulated frame 106 and/or to facilitate hovering in close proximity to the opened articulated frame 106. The indicators 1510 may enable the drone 1504, or the operator of the drone 1504, to determine if the opening of the articulated frame 106 is sufficiently large to receive the delivered package 112. Further, the indicators 1510 may enable the drone 1504, or the operator of the drone 1504, to determine that the articulated frame 106 has properly closed and/or has been properly retracted after delivery of the package 112.

Various types of extendable arms 1506 may be used by embodiments of the delivered package security system 100. In the illustrated example embodiment shown in FIG. 15B, the arm 1506 comprises a plurality of arm members coupled together at their respective ends in a scissor-like fashion. Other embodiments may use a telescoping arm 1506 that may be extendable using a gas or fluid.

Other embodiments may use a long fixed rigid arm that when released by a latch, swings outward and/or downward from the building 1508 to an extended position. After delivery of the package 112, the fixed arm then swings back to the side of the building 1508 to a retracted position. Some embodiments may use a motor to retract a cord affixed to the distal end of the arm 1506 or the articulated frame 106.

The example embodiment illustrated in FIG. 20A indicates that the controller system 104 is co-located with the articulated frame 106 and basket 108 at the distal end of the arm 1506. In other embodiments, the controller system 104 may be located elsewhere, such as at, but not limited to, the proximal end of the arm 1506.

The example embodiment illustrated in FIG. 20A indicates that the delivered package security system 100 is secured to the window frame 1502. Here, the window 1512 may be opened to permit installation of the delivered package security system 100 to the window frame 1502. The window 1512 may then be closed and secured, thereby securing the delivered package security system 100 to the building 2008. Other embodiments having the extendable arm 1506 may be secured to a door 110 (FIG. 1), a window, a gate, a balcony or some other fixed location object that is not removeable.

An alternative embodiment employs an inverted support member 102 that is generally formed in a j-shape or u-shape. When secured to a door 110, the joining support member 102c rests on the top surface of the door. The outside support member 102a and the inside support member 102b extend downwardly from the joining support member 102c. When secured to a window frame 1502, the joining support member 102c rests on the top surface of the window sill. When the window 1512 is closed, the delivered package security system 100 is secured to the window frame 1502.

FIGS. 16A-16E are drawings of an example embodiment of a delivered package security system 100. Features and elements previously described hereinabove are not again described for brevity.

A reinforcement system 1602 comprises a cylindrical shaped or spherical shaped reinforcement roller 1604, a reinforcement arm 1606 (such as the upper member 118a of the reinforcement plate 118), and a roller retainer 1608 in a recess that is set back into the lower end of the outside support member 102a. The distal end (upper end) of the reinforcement arm 1606 is secured to the outside support member 102a. In some embodiments, a hinge may be used to secure the reinforcement arm 1606 to the outside support member 102a. Alternatively, the reinforcement arm 1606 may be flexible. The proximal end (lower end) of the reinforcement arm 1606 is curved outward and downward so as to engage and retain the reinforcement roller 1604 as the door 110 is being opened and/or closed. The roller retainer 1608 further retains the reinforcement roller 1604 in place.

When the door 110 is partially opened, the reinforcement roller 1604 rests on the surface of the floor 116. When the door is moving during opening or closing, the reinforcement roller 1604 freely rolls along the surface of the floor 116 (see FIGS. 16B, 16C). When the door 110 is closing, at some juncture, the reinforcement roller 1604 comes into contact with the door jamb 120. The hinged reinforcement arm 1606 allows the reinforcement roller 1604 to roll upwards over onto the surface of the door jamb 120 so that the door 110 can be closed (see FIGS. 16D, 16E). When the door 110 is later opened, the elasticity of the reinforcement arm 1606 pushes the reinforcement roller 1604 downward onto the surface of the floor 116. Alternatively, the reinforcement arm 1606 may be inelastic or substantially inelastic with the reinforcement roller 1604 secured to the end of the reinforcement arm 1606.

In the event of a theft attempt, the thief may try to bend the outside support member 102a of the delivered package security system 100 outward and away from the door 110. The reinforcement arm 1606 and the reinforcement roller 1604 would then be urged against the upper surface of the door jamb 120, thereby resisting the thief's effort to bend the outside support member 102a of the delivered package security system 100 outward and away from the door 110.

It should be emphasized that the above-described embodiments of the delivered package security system 100 are merely possible examples of implementations of the invention. Many variations and modifications may be made to the above-described embodiments. All such modifications and variations are intended to be included herein within the scope of this disclosure and protected by any later filed claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A delivered package security system, comprising:
   a support member defined by an outside support member, an inside support member, and a joining support member, wherein the joining support member is secured between a proximal end of the outside support member and a proximal end of the inside support member, and wherein the support member is secured to a fixed location structure;
   a basket configured to receive a delivered package;
   an articulated frame, wherein the articulated frame opens to allow entry of the delivered package into the basket, and wherein the articulated frame closes to secure the delivered package within the basket;
   a latch; and a controller system controllably coupled to the latch,
wherein the controller system is coupled to the outside support member,
wherein an opening of the basket is secured to the articulated frame,
wherein the articulated frame is coupled to the outside support member,
wherein the articulated frame is secured in a closed position by the latch,
wherein the controller system releases the latch in response to an arrival of a package so that the articulated frame is opened to receive the delivered package into the basket, and
wherein after the articulated frame is closed with the delivered package residing in the basket, the controller system engages the latch to lock the closed articulated frame.

2. The delivered package security system of claim 1, further comprising:
an attachment means secured to the inside support member, wherein the attachment means releasably secures the support member to the fixed location structure,
wherein the attachment means is not accessible by a thief or unauthorized person who is attempting to operate the attachment means to release the support member from the fixed location structure.

3. The delivered package security system of claim 2, wherein the fixed location structure is a window frame, and wherein when a window in the window frame is closed, a thief or unauthorized person cannot operate the attachment means to release the support member from the fixed location structure.

4. The delivered package security system of claim 3, wherein the attachment means comprises:
a tightening bolt; and
a locking plate secured to a distal end of the tightening bolt,
wherein a proximal end of the tightening bolt is threaded through a threaded aperture disposed near the top of the inside support member,
wherein the tightening bolt is used to urge and tighten the locking plate to the inside surface of a wall proximate to the window frame, and
wherein after the tightening of the locking plate, the locking plate and the inside surface of the outside support member frictionally secure the support member to the window frame.

5. The delivered package security system of claim 2, wherein the fixed location structure is a door, wherein when door is closed, a thief or unauthorized person cannot operate the attachment means to release the support member from the fixed location structure.

6. The delivered package security system of claim 5, wherein the attachment means comprises:
a tightening bolt; and
a locking plate secured to a distal end of the tightening bolt,
wherein a proximal end of the tightening bolt is threaded through a threaded aperture disposed near the top of the inside support member,
wherein the tightening bolt is used to urge and tighten the locking plate to the inside surface of the door, and
wherein after the tightening of the locking plate, the locking plate and the inside surface of the outside support member frictionally secure the support member to the door.

7. The delivered package security system of claim 1, further comprising:
a smart door bell system with a camera,
wherein image information acquired by the camera is communicated to an electronic device of an owner of the delivered package security system or an authorized person,
wherein the owner or authorized person visually confirm identity of a courier who is delivering the package, and
wherein the owner or authorized person communicates via the electronic device a release signal to the controller system that causes the controller system to release the latch so that the courier can open the articulated frame and place the delivered package into the basket.

8. The delivered package security system of claim 1, further comprising:
a smart door bell system with a doorbell button,
wherein a signal is communicated to an electronic device of an owner of the delivered package security system or an authorized person in response to a courier who is delivering the package actuating the doorbell button, and
wherein the owner or authorized person communicates via the electronic device a release signal to the controller system that causes the controller system to release the latch so that the courier can open the articulated frame and place the delivered package into the basket.

9. The delivered package security system of claim 1, further comprising:
a scanner,
wherein a courier who is delivering the package scans an identification code on the package that identifies the package,
wherein a signal is communicated to an electronic device of an owner of the delivered package security system or an authorized person in response to the courier scanning the scanning the code on the package, and
wherein the owner or authorized person communicates via the electronic device a release signal to the controller system that causes the controller system to release the latch so that the courier can open the articulated frame and place the delivered package into the basket.

10. The delivered package security system of claim 1, further comprising:
a reinforcement plate defined by an upper member and a lower member,
wherein the upper member of the reinforcement plate is secured to an outside surface proximate to a lower end of the outside support member,
wherein the lower member of the reinforcement plate extends outwardly from the outside support member and is above an upper surface of a floor or a door jamb,
wherein the lower member of the reinforcement plate would then be urged against the upper surface of the floor or the door jamb in response to an outward force pulling the outside support member outward, thereby resisting an effort to bend the outside support member of the delivered package security system outward and away from the fixed location structure.

11. The delivered package security system of claim 10, wherein the reinforcement plate further comprises:
at least one bolt that secures the upper member of the reinforcement plate to the outside surface of the outside support member, wherein the at least one bolt can only be released when the delivered package security system has been removed from the fixed location structure.

12. The delivered package security system of claim 1, wherein the fixed location structure is a door that swings open and closed over a floor and the delivered package security system is secured to the door, further comprising:
   a cylindrical shaped or spherical shaped reinforcement roller; and
   a reinforcement arm defined by an upper proximal end and a lower distal end,
   wherein the proximal end of the reinforcement arm is coupled to an outside surface of a lower end of the outside support member,
   wherein the reinforcement arm is curved outward and downward so as to engage and retain the reinforcement roller,
   wherein the reinforcement roller rests on a surface of the floor when the door is being opened or closed such that when the door is moving during the opening or the closing, the reinforcement roller freely rolls along the surface of the floor,
   wherein when the door is closing, at some juncture, the reinforcement roller comes into contact with a door jamb and rolls roll upwards over onto a surface of the door jamb so that the door closes, and
   wherein the reinforcement arm and the roller retainer would then be urged against the upper surface of the door jamb in response to an outward force pulling the outside support member outward, thereby resisting an effort to bend the outside support member of the delivered package security system outward and away from the fixed location structure.

13. The delivered package security system of claim 12, wherein the reinforcement arm is flexible and is secured to the outside surface of the lower end of the outside support member.

14. The delivered package security system of claim 12, wherein the reinforcement arm is rigid, and further comprising:
   a hinge,
   wherein the hinge secures the proximal end of the reinforcement arm to the outside support member.

15. The delivered package security system of claim 1, further comprising:
   an arm defined by a distal end and a proximal end,
   wherein the distal end of the arm is secured to the distal upper end of the outside support member,
   wherein the articulated frame is coupled to the proximal end of the arm, wherein when the arm is in an extended position, the articulated frame is extended outward from the fixed location structure so that a drone may deliver the package into the basket, and
   wherein when the arm is in a retracted position, the articulated frame is proximate to the fixed location structure, is closed, and is secured by the latch.

16. The delivered package security system of claim 15, wherein the arm is a telescoping arm that is configured to extend the articulated frame outward from the fixed location structure.

17. The delivered package security system of claim 15, wherein the arm comprises:
   a plurality of arm members coupled together at their respective ends,
   wherein the plurality of arm members are configured to extend the articulated frame outward from the fixed location structure.

18. The delivered package security system of claim 15, wherein the arm is a long fixed rigid arm that is configured to swing the articulated frame outward from the fixed location structure.

19. The delivered package security system of claim 15, wherein the articulated frame comprises:
   at least one target on an upper surface of the articulated frame,
   wherein the drone optically recognizes the at least one target to orient itself with the articulated frame for delivery of the package into the basket.

20. The delivered package security system of claim 15, wherein the controller system is secured to the proximal end of the arm.

* * * * *